United States Patent [19]

Ticknor et al.

[11] 4,233,367
[45] Nov. 11, 1980

[54] COEXTRUDED MULTILAYER FILM

[75] Inventors: William G. Ticknor, Appleton; Arnold R. Rein, Menasha, both of Wis.

[73] Assignee: American Can Company, Greenwich, Conn.

[21] Appl. No.: 757,140

[22] Filed: Jan. 6, 1977

[51] Int. Cl.$^3$ .............................................. B32B 27/08
[52] U.S. Cl. ........................... 428/476.3; 156/244.14; 264/514; 264/171; 264/173; 428/476.9; 428/515; 428/521
[58] Field of Search ................. 264/95, 173, 171, 563, 264/514; 428/474, 500, 521, 476.3, 476.9, 515; 156/244, 244.12, 244.13, 244.14

[56] References Cited

U.S. PATENT DOCUMENTS

| | | | |
|---|---|---|---|
| 3,423,231 | 1/1969 | Lutzmann | 428/474 |
| 3,561,493 | 2/1971 | Maillard et al. | 264/173 |
| 3,791,915 | 2/1974 | Goehring et al. | 156/244 |
| 3,798,115 | 3/1974 | Hofmann et al. | 428/474 |
| 3,836,620 | 9/1974 | Bhuta et al. | 264/171 |
| 3,908,070 | 9/1975 | Marzolf | 428/474 |
| 4,058,647 | 11/1977 | Inoue et al. | 428/474 |
| 4,087,587 | 5/1978 | Shida et al. | 428/500 |
| 4,087,588 | 5/1978 | Shida et al. | 428/500 |

OTHER PUBLICATIONS

"Plexar-Novel Extrudable Adhesive Resins", by M. Shida et al., presented TAPPI/SPE Paper/Synthetics Conference, 9-1976.

Primary Examiner—Jeffery R. Thurlow
Attorney, Agent, or Firm—Robert P. Auber; Ira S. Dorman; George P. Ziehmer

[57] ABSTRACT

A multilayer film is prepared by coextruding nylon with a chemically modified polyolefin which has functional groups added to the basic polymer to provide strong adhesion to the nylon after coextrusion. The multiple layer film combines the strength and protection properties of the nylon with desired properties in the modified polyolefin. Multiple layer films may be produced by coextruding nylon layers with multiple layers of the modified polyolefin, and with additional layers of non-modified polyolefins and other polymers. Suitable commercially available modified polyolefins for use in the multilayer film include Plexar-1 and Plexar-3 described in U.S. patent application Ser. No. 616,035, and Plexar-2 described in U.S. patent application Ser. No. 616,374, both filed in September, 1975, now abandoned, and respective continuation-in-parts thereof Ser. No. 808,080, now U.S. Pat. No. 4,087,588, and Ser. No. 808,079, now U.S. Pat. No. 4,087,587.

11 Claims, No Drawings

COEXTRUDED MULTILAYER FILM

BACKGROUND OF THE INVENTION

1. Field of the Invention

This invention pertains generally to multilayer polymer films and methods for producing the same.

2. Description of the Prior Art

Various polymer films are utilized as packaging materials to provide a sealed package for food and other products. Such films may be transparent to allow inspection by the consumer of the product through the film, but to nonetheless seal out air and seal in moisture and juices. Polymer films such as sarans and polyethylene, and various modifications thereof, have proven useful in food packaging.

Often, the various desirable characteristics that a packaging film must provide are not attainable in a film composed of a single polymer material. For example, relatively high tensile strengths and moisture and oxygen impermeability is desired in films which are utilized to package meat products. Various nylon resins may be utilized to form such high tensile strength oxygen impermeable films since nylon yields one of the strongest of the commonly utilized films. However, nylon is not easily heat sealed to itself with conventional sealing equipment, and must be adhered to itself with adhesives or at relatively high temperatures that may affect the food material that is being packaged. To provide the desirable strength properties of nylon in combination with the relatively low temperature heat sealing properties of other polymers, attempts have been made to combine nylon layers with layers of easily heat sealed polymers such as ionomers (metal salt neutralized copolymers of ethylene and acrylic acid or methacrylic acid, available from DuPont under the name Surlyn). It has been found that nylon is a difficult material with which to form strong multilayer films, and generally poor adhesion between the nylon layer and the other polymer layers results. Moreover, the other polymers utilized, such as ionomer, are often subject to degradation of the adhesive bond between the nylon and the polymer in the presence of high moisture and elevated temperatures. Such materials thus may be subject to delamination when used for the packaging of moist materials such as fresh meats.

SUMMARY OF THE INVENTION

A multilayer film in accordance with this invention includes at least one layer of nylon film which is coextruded with at least one layer of a chemically modified polyolefin, to provide a film structure which has the desirable strength characteristics and oxygen impermeability of nylon, combined with the low temperature heat sealing properties of the modified polyolefin. The chemically modified polyolefin utilized in the coextrusion with nylon is especially synthesized to have a high bonding strength with film forming grades of nylon. Additional layers of modified polyolefin may be coextruded with the nylon layer to provide a structure of three or more layers, and other film-forming materials, such as polyolefins and copolymers including polyolefins, may be extruded and bonded to the modified polyolefin layers to provide a final structure having a composite of the desired qualities contributed by the individual film layers.

A preferred process for the production of such a multilayer film is the blown coextrusion process, wherein resins of the nylon and the modified polyolefin are formed into concentric tubes which are contacted and conjoined while the layers of nylon and modified polyolefin are still in the melt state, and are blown, cooled, and wound, in accordance with the conventional blown extrusion process. Other additional layers, such as additional layers of modified polyolefin over the nylon layer, and other polymer layers in contact with the modified polyolefin, may be formed by coextruding conjoined concentric tubes of the various copolymer materials to form the final multilayer film. Although tubular blown film coextrusion is preferred, cast coextrusion and the water quench extrusion processes may also be utilized to form the multilayer film in accordance with conventional coextrusion procedures.

The resulting multilayer film of nylon and modified polyolefin has highly desirable strength characteristics and oxygen impermeability contributed by the nylon layer, and the ability to provide moisture protection and heat sealing with the lower temperature melting polyolefin. Moreover, the modified polyolefins in accordance with this invention provide high interlayer bond strengths and are not subject to excessive bond weakening and delamination in moist environments. Such multilayer films are thus highly adapted to use for packaging food products such as raw meats, fresh fruits, and vegetables, as well as many food and non-food products.

Further objects, features, and advantages of the invention will be apparent from the following detailed description illustrating preferred embodiments of the invention.

DESCRIPTION OF THE PREFERRED EMBODIMENTS

The multilayer film of this invention has a base substrate of nylon film, to which is firmly bonded a modified polyolefin which has the property of achieving a strong and durable bond with the nylon film when the nylon and modified polyolefin are coextruded. The coextrusion may be performed by conventional extrusion processes, such as cast extrusion through a flat die or tubular blown film, or both cast and tubular water quench coextrusions.

Normal polyolefins, and copolymers of other materials with polyolefins, are not easily bonded to nylon when formed as a multilayer film in the coextrusion process. Usually the bond is so weak that it delaminates spontaneously, or will lose adhesion over a period of time, especially in a moist atmosphere or where the polymer film is of the type that may be penetrated by moisture.

A number of layers may be provided in the final multilayer film, with each layer contributing desired characteristics to the overall structure. For example, the coextruded multilayer film may consist of a layer of nylon sandwiched between two layers of modified polyolefin to provide heat sealing surfaces on both sides of the laminate. Moreover, the presence of the modified polyolefin layer on both sides of the nylon layer helps to counteract any tendency of the multilayer film to curl toward one side or the other, which may be the case where only two layers of material are joined together. The outside polyolefin layers may further have other polymer materials, such as polyolefins and complex polymers such as ionomer, bonded thereto, since such materials will bond well to the modified polyolefin layer although they will not provide a satisfactory bond to the nylon layer.

The chemically modified polyolefin may be obtained from a number of polyolefin resins, such as high, medium and low density polyethylenes, ethylene vinyl acetate polymer, and ethylene acrylic acid polymer, which are modified by the provision of functional groups to the polymer which have a strong affinity for the nylon molecules, and which will form strong bonds to nylon under the heat and pressure involved in the coextrusion process.

Chemically modified polyolefins suitable for coextruding with nylon in accordance with this invention are available from the Chemplex Company of Rolling Meadows, Illinois, under the name Plexar. Typical Plexars are modified polyolefins and modified copolymers of polyolefins and other materials. For example, commercially available grades of such modified polyolefins include Plexar-1, a modified ethylene vinyl acetate polymer, Plexar-2, a modified high density polyethylene, Plexar-2 modified with an elastomer or "rubber" such as polyisobutylene, and Plexar-3, a modified ethylene vinyl acetate polymer adapted for cast film coextrusion. Other polyolefins and copolymers thereof may be so modified to allow their strong adhesion to nylon in either the cast or blown coextrusion process.

A number of other materials may be coextruded with the nylon and modified polyolefin layers, as indicated above, including by way of illustration but not limitation, high, medium, and low density polyethylene, ionomers (such as Surlyn), ethylene vinyl acetate polymer, ethylene acrylic acid polymer, as well as other common polyolefin film forming materials and rubber modified polyolefins. By the use of the multilayer combinations of modified polyolefins and nylon, the modified polyolefins may provide the moisture barrier and heat sealability, while nylon provides tensile strength of the overall film and resistance to gas permeation.

The following examples are provided as illustrative of the invention, but are not to be construed as being exhaustive or as limiting the invention to the specific details thereof.

EXAMPLE I

A multilayer film of nylon 6 and modified ethylene vinyl acetate polymer, obtained from the Chemplex Company under the name Plexar-1, was produced by placing the nylon and Plexar resins in standard tubular blown film coextrusion equipment, and coextruding the melted resins to form a multilayer film having a thickness of 3.8 mils. Samples of the multilayer film web were maintained in a high humidity heat chamber under controlled conditions for various periods of time: 48 hours at 100° F. at 90% relative humidity; 2 weeks at 73° F. at 50% relative humidity; 4 weeks at 73° F. at 50% relative humidity; and 8 weeks under room temperature conditions. The samples so treated were tested for adhesion in an Instron tester, and all of the samples under all the test conditions stated had sufficient bonding between the nylon and the modified ethylene vinyl acetate polymer such that the layers could not be separated.

EXAMPLE II

A multilayer film having a 2 mil nylon 6 layer and a 4.5 mil layer of rubber modified Plexar-2 bonded thereto, was formed by coextruding the two resins through a tubular blown film die to produce a multilayer film. Separation of the films could not be obtained without tearing of the individual films. A sealing temperature of 300° F. applied between the Plexar sides of the multilayer film for 3 seconds at 50 psig. was required to obtain heat sealing of the film.

EXAMPLE III

A multilayer film was formed of three equal thickness layers of nylon 6, Plexar-1, and Surlyn 1601 ionomer (obtained from DuPont). After coextrusion in tubular blown film equipment, the resulting film had a total thickness of approximately 3.5 mils, a machine direction tensile strength of 7,200 psi. and a cross machine direction tensile strength of 7,030 psi. The minimum temperature necessary to obtain a seal between the Surlyn surfaces of the multilayer film was 250° F. at 50 psig. for 1 second, and the seal strength as measured on an Instron tester, with a 90° angle supported tail, at 50 psig. for 1 second, was 8.4 lbs. per one inch width of the film.

A separation could not be obtained between the nylon and the Plexar layer. However, separation could be obtained between the Surlyn layer and the Plexar layer. As measured on an Instron tester with 90° freewheeling backed Surlyn layer pulled from the Plexar layer at 10 inches per minute, an initial force of 1260 g./in. was required to separate the Surlyn layer from the Plexar layer.

EXAMPLE IV

A multilayer film composed of 33% nylon 6,20% Plexar-1, and 47% low density polyethylene (Gulf 4530) was formed by coextruding the resins in tubular blown film extrusion equipment capable of providing three layer coextrusions. The resulting multilayer film had a thickness averaging about 3.5 mils. The machine direction tensile strength of the multilayer film as measured on an Instron tester was 5,050 psi., and the cross direction tensile strength was 4,930 psi. The minimum sealing temperature required to seal the polyethylene layer to itself was 260° F . applied at 50 psig. for 1 second. The seal strength as measured on the Instron tester, of the polyethylene to polyethylene seal, utilizing a 90° angle supported tail at 50 psig., for 1 second, was 12 lbs. per one inch width of the multilayer film. Separations could not be obtained between either the Plexar and nylon layer on the polyethylene and Plexar layer.

EXAMPLE V

A multilayer film was formed of 33% nylon 6, 20% Plexar-1, and 47% ethylene vinyl acetate polymer obtained from the DuPont Company as DuPont 3120. The resins were coextruded through a tubular blown film die capable of providing coextrusions of three layers. The resulting multilayer film had a thickness of approximately 2.8 mils, and a tensile strength as measured on an Instron tester of 6,250 psi. in the machine direction, and 5,960 psi. in the cross machine direction.

The oxygen permeability of a pouch formed from the multilayer film was tested at 73° F. and 50% relative humidity to determine the number of cubic centimeters of test gas per 24 hours that would permeate the film. The test results indicate that 20 cubic centimeters of oxygen per sq. meter, or 1.3 cubic centimeters per 100 sq. inches, will permeate the film in a 24-hour period.

The minimum sealing temperature between the ethylene vinyl acetate polymer layer to itself at 50 psig. for 1 second is 250° F. The seal strength of the ethylene vinyl acetate layer to itself, utilizing an Instron tester, with a 90° angle supported tail on the film at 50 psig. for 1 second, is 8.4 lbs. per one inch width. Separations could not be obtained between the Plexar layers and the nylon layer.

It is understood that the invention is not confined to the particular embodiment described herein as illustrative of the invention, but embraces all such modifications thereof as may come within the scope of the following claims.

I claim:

1. A process for producing a multilayer film, comprising: coextruding nylon and a chemically modified polyolefin selected from the group consisting of ethylene vinyl acetate polymer, high density polyethylene and rubber modified high density polyethylene, each chemically modified by the provision of functional groups to the polymer which have a strong affinity for nylon and which will form a strong bond to nylon under heat and pressure of coextrusion.

2. The process of claim 1 wherein said modified polyolefin is a Plexar polymer.

3. The process of claim 1 wherein the nylon is coextruded between two layers of the modified polyolefin.

4. The process of claim 1 wherein a polyolefin is coextruded with said nylon and said chemically modified polyolefin.

5. A multilayer film comprising: a coextrusion of nylon and a chemically modified polyolefin selected from the group consisting of ethylene vinyl acetate polymer, high density polyethylene, and rubber modified high density polyethylene, each chemically modified by the provision of functional groups to the polymer which have a strong affinity for nylon and which will form strong bonds to nylon under the heat and pressure of coextrusion.

6. The multilayer film of claim 5 wherein said coextrusion includes a layer of nylon between two layers of chemically modified polyolefin having strong adhesion to nylon after coextrusion.

7. The multilayer film of claim 5 wherein said modified polyolefin is a Plexar polymer.

8. A process for producing a multi-layer film, comprising: tubular blown film coextruding nylon and a chemically modified polyolefin selected from the group consisting of ethylene vinyl acetate polymer, high density polyethylene and rubber modified high density polyethylene, each chemically modified by the provision of functional groups to the polymer which have a strong affinity for nylon and which will form a strong bond to nylon under heat and pressure of coextrusion.

9. A process for producing a multi-layer film, comprising: coextruding nylon, a chemically modified polyolefin, and a polymer, said chemically modified polyolefin being selected from the group consisting of ethylene vinyl acetate polymer, high density polyethylene and rubber modified high density polyethylene, each chemically modified by the provision of functional groups to the polymer which have a strong affinity for nylon and which will form a strong bond to nylon under heat and pressure of coextrusion, said polymer being selected from the group consisting of low, medium, and high density polyethylene, ionomers, ethylene vinyl acetate polymer, and ethylene acrylic acid polymer.

10. A multi-layer film comprising: a coextrusion of nylon, a chemically modified polyolefin, and a polymer layer bonded to said modified polyolefin, said modified polyolefin selected from the group consisting of ethylene vinyl acetate polymer, high density polyethylene, and rubber modified high density polyethylene, each chemically modified by the provision of functional groups to the polymer which have a strong affinity for nylon and which will form strong bonds to nylon under the heat and pressure of coextrusion, said polymer layer being selected from the group consisting of high, medium and low density polyethylene, ionomers, ethylene vinyl acetate polymer, ethylene acrylic acid polymer, and rubber modified polyethylene.

11. A multi-layer film comprising: a coextrusion of nylon between two layers of a chemically modified polyolefin and a layer of polymer bonded to each of said layers of said modified polyolefin, said modified polyolefin being selected from the group consisting of ethylene vinyl acetate polymer, high density polyethylene, and rubber modified high density polyethylene, each chemically modified by the provision of functional groups to the polymer which have a strong affinity for nylon and which will form strong bonds to nylon under the heat and pressure of coextrusion, and said polymer being selected from the group consisting of high, medium, and low density polyethylene, ionomers, ethylene vinyl acetate polymer, ethylene acrylic acid polymer, and rubber modified polyethylene.

* * * * *